H. B. SPERRY.
LUG FOR TRACTION WHEELS.
APPLICATION FILED APR. 22, 1918.
1,395,367.
Patented Nov. 1, 1921.
2 SHEETS—SHEET 2.
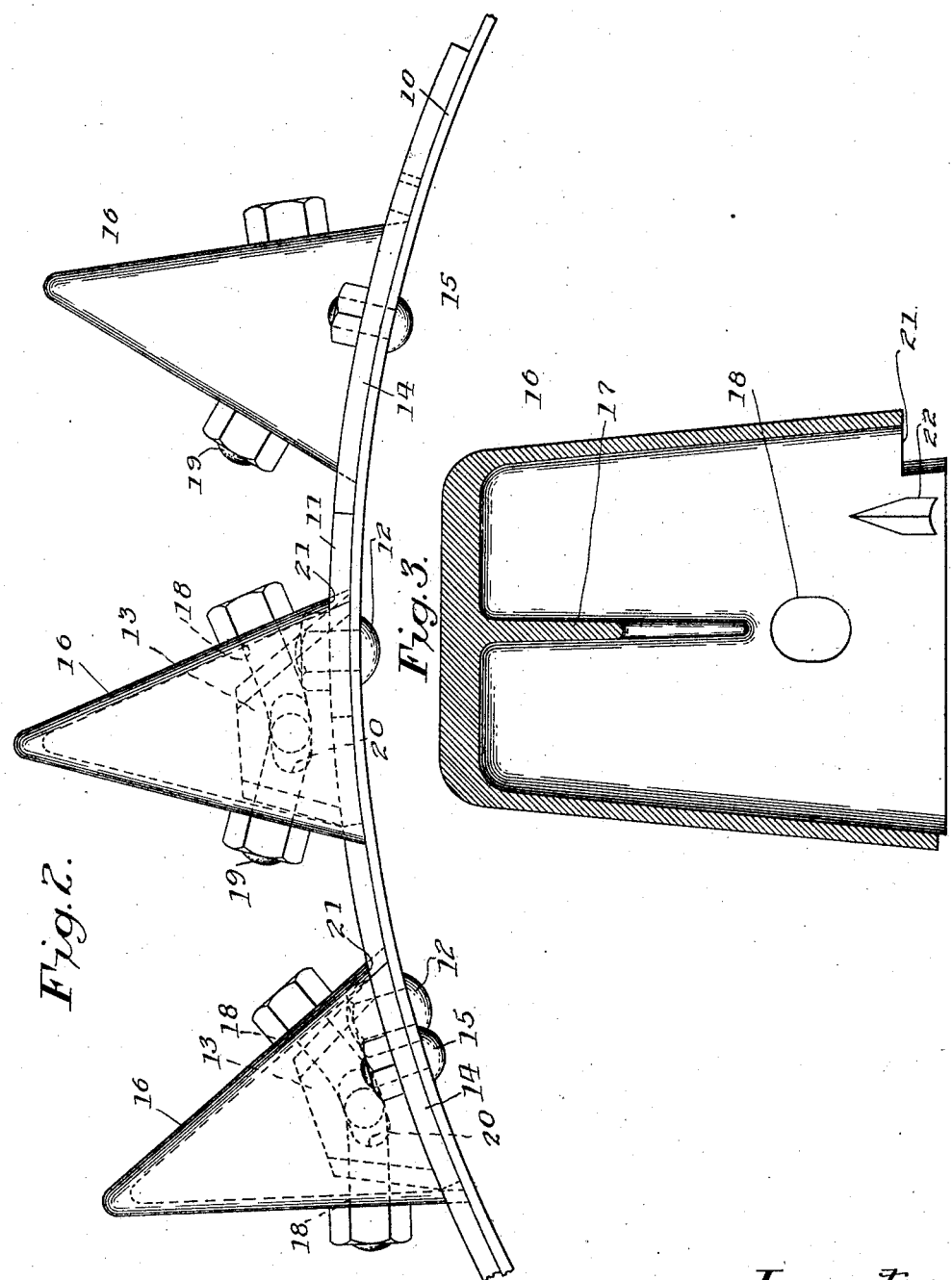
Inventor.
Herbert B. Sperry,
by

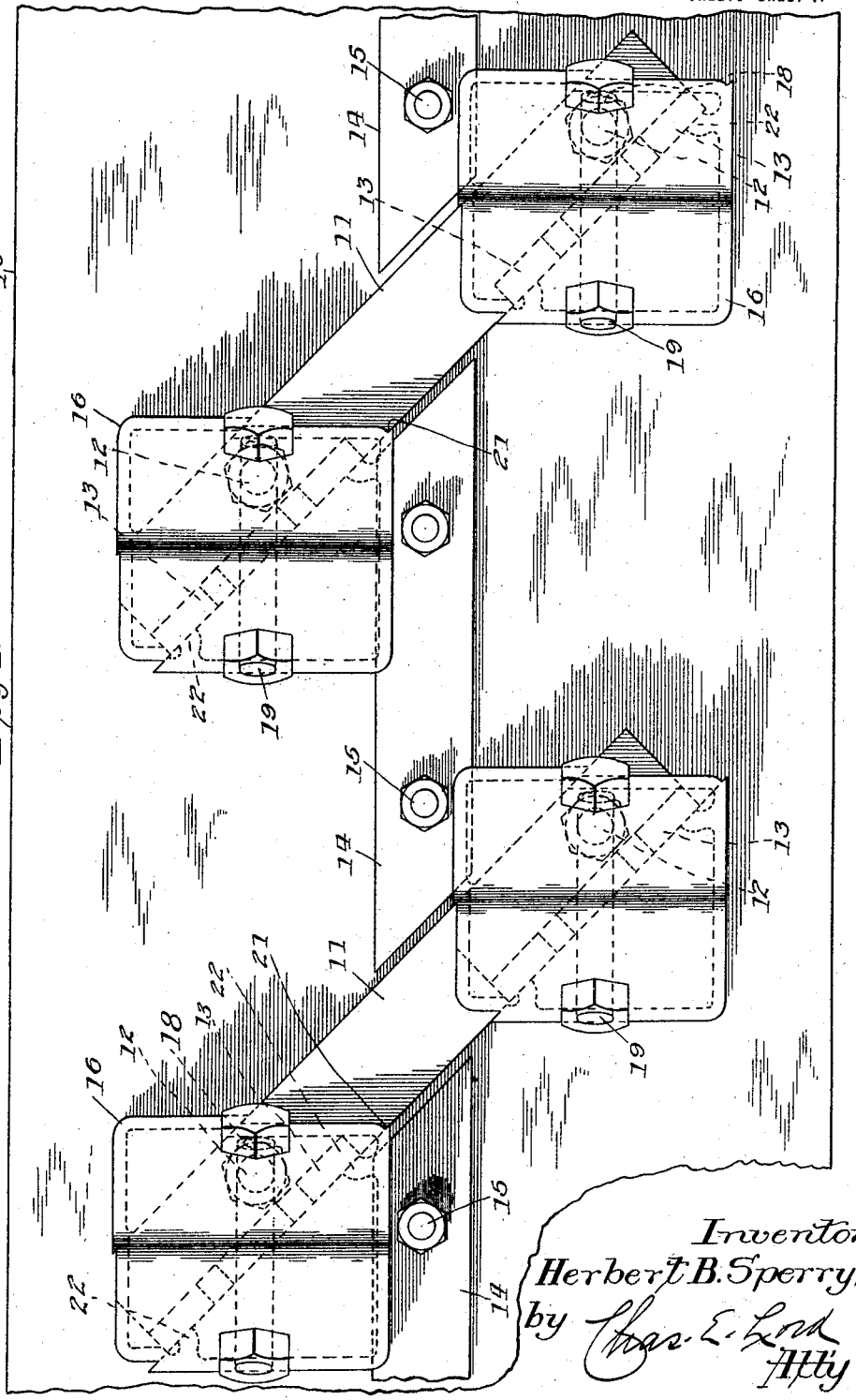

UNITED STATES PATENT OFFICE.

HERBERT B. SPERRY, OF CHICAGO, ILLINOIS, ASSIGNOR, BY MESNE ASSIGNMENTS, TO INTERNATIONAL HARVESTER COMPANY, A CORPORATION OF NEW JERSEY.

LUG FOR TRACTION-WHEELS.

1,395,367. Specification of Letters Patent. Patented Nov. 1, 1921.

Application filed April 22, 1918. Serial No. 230,023.

*To all whom it may concern:*

Be it known that I, HERBERT B. SPERRY, a citizen of the United States, residing at Chicago, in the county of Cook and State of Illinois, have invented certain new and useful Improvements in Lugs for Traction-Wheels, of which the following is a full, clear, and exact specification.

This invention relates to traction lugs for use more particularly on harvesters or implements where a large amount of tractive effort is required to operate the various parts of the machine.

The traction lug in which my invention is embodied is in the nature of a supplemental lug which is adapted to be attached to some portion of a traction wheel, such as the regular traction lugs, to assist in the operation of the machine in sandy and muddy soil. Such a supplemental lug is especially desirable on rice harvesters which operate in fields where the soil is muddy and which require a large amount of tractive effort in order to operate the cutting and binding machinery.

In machines of this type the body of the wheel is usually inclosed by sheet metal shields in order to keep the water and mud from the inside of the wheel. When the wheel body is so inclosed and a supplemental traction lug is to be attached to the periphery thereof, the means for attaching this supplemental lug must of necessity be disposed entirely outside the wheel body since access cannot be obtained to the inside thereof.

The object of the invention therefore is to provide a supplemental lug that may be easily and quickly attached to the wheel of a harvester or other implement.

With this object in view the invention consists in a lug and means for attaching this lug to the outer surface of the wheel. In the form illustrated the lug is attached directly to the regular traction lugs which are carried by the wheel; but this is not regarded as essential and the embodiment which will now be described has been shown merely for the purpose of illustrating one form which the invention may assume.

In the accompanying drawings Figure 1 illustrates a fragmentary plan view of the tread of a traction wheel having my improved supplemental lugs secured thereto;

Fig. 2 is a side elevation of the construction shown in Fig. 1; and

Fig. 3 is a longitudinal sectional view on an enlarged scale of one of the lugs.

In the embodiment of the invention illustrated in the drawings, the tread 10 of the wheel is provided with diagonally disposed plates 11 which in this instance are secured to the tread of the wheel by means of bolts 12. If found desirable these plates 11 may be formed integral with the tread of the wheel, or they may be dispensed with and the regular lugs hereinafter described may be secured to or formed on the tread of the wheel. Upwardly extending traction lugs 13 are formed integral with the plates 11 and these lugs are sufficient under ordinary conditions to furnish the required tractive force. A longitudinally extending series of plates 14 is secured by bolts 15 or other suitable securing means to the tread 10, the plates 14 bridging the space between the plates 11. If desired, the plates 14 may be utilized as a central track for a scraper which is secured to the frame of the harvester and scrapes the mud from the peripheral surface of the wheel. This scraper is usually formed of spring metal and is normally pressed into contact with the plates 14 and the central portion of the plates 11. When the scraper is used the bolts or rivets for plates 14 should be countersunk in the plates.

The supplemental traction lug 16 is substantially V-shaped in elevation and is provided throughout a portion of its inner surface with a web 17 which reinforces the same and provides a more rigid construction. The lug 16 is provided with oppositely disposed apertures 18, through which a securing bolt 19 is passed to clamp the lug 16 to the lugs 13. The bolt 19 also passes through a central obliquely formed aperture 20 in the lugs 13.

It will be noted from an inspection of Fig. 2 that the central aperture 20 in the lug 13 is located below apertures 18 in the lug 16, and therefore as the nut is screwed onto the bolt 19 the lug 16 is forced downwardly into firm contact with the periphery of the wheel.

In the embodiment of the invention illustrated the lower surface of the lug 16 is cut away as shown at 21 and overlaps the plate 14 and the diagonal plate 11 which extends across the under surface of the lug. If desired, however, the lugs 16 may be disposed at each side of the plates 14 and they will be held against lateral movement by engagement with the sides of the plates. The lug 16 is also provided with inwardly extending abutments 22 so disposed that they will bear against the side edge of the plate 11 and lug 13 and assist in holding the lug firmly in place.

From the above description it will be seen that I have provided an exceedingly simple and practical supplemental traction lug which may be easily and quickly secured in place on the periphery of the traction wheel when it is found that the required tractive effort is not being obtained by the use of the regular lugs. In order to attach the lug to the wheel it is simply necessary to place the lug 16 over the regular traction lug 13, pass the bolt 19 through the apertures 18 and aperture 20 in the lug 13 and secure the bolt 19 in place by tightening the nut thereon.

While I have in the above specification described one embodiment which my invention may assume, it should be understood that the invention is capable of modification and that modifications may be employed without departing from the spirit and scope of the invention as expressed by the following claims:

1. A substantially V-shaped detachable lug for traction wheels having oppositely disposed apertures in its inclined walls for the reception of securing means.

2. In combination, a wheel having a traction lug disposed on the periphery thereof, a detachable V-shaped supplemental lug, and clamping means extending through the side walls of said supplemental lug outside of the periphery of the wheel for securing said supplemental lug to said first named lug.

3. In combination, a wheel having a traction lug on the periphery thereof, a supplemental lug and means located beyond the periphery of the tread of the wheel and passing transversely through said traction lug for securing said supplemental lug to said first named lug.

4. In combination, a wheel having a plate secured to the periphery thereof, a traction lug carried by said plate, a supplemental lug bodily removable from the wheel, means outside of and beyond the wheel tread for securing the supplemental lug to the first lug, said supplemental lug having a cut away portion for the reception of said plate.

5. In combination, a wheel having traction lugs secured thereto, a supplemental traction lug, means disposed on the inner surface of said supplemental lug for engagement with said first named lug, and means outside of the periphery of the wheel tread for securing said supplemental lug to said first named lug.

6. In combination, a wheel having a traction lug disposed on the periphery thereof, a supplemental lug, said first named lug having an aperture therein, and said supplemental lug having oppositely disposed apertures located radially outward from said aperture in said first named lug when the supplemental lug is disposed in position to be secured to said first named lug.

7. In combination, a wheel having a traction lug disposed on the periphery thereof and having an aperture, a supplemental lug having apertures therein, and means passing through said apertures for securing said supplemental lug to said first named lug, the apertures being out of alinement.

In testimony whereof I affix my signature.
HERBERT B. SPERRY.